United States Patent
Metzler

(10) Patent No.: US 7,848,855 B2
(45) Date of Patent: Dec. 7, 2010

(54) METHOD FOR OPERATING A SYSTEM OF MODULAR STRUCTURE, IN PARTICULAR A PROCESS AUTOMATION SYSTEM

(75) Inventor: Matthias Metzler, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 225 days.

(21) Appl. No.: 12/152,230

(22) Filed: May 13, 2008

(65) Prior Publication Data

US 2008/0284247 A1 Nov. 20, 2008

(30) Foreign Application Priority Data

May 18, 2007 (EP) .................................. 07009961

(51) Int. Cl.
*G05B 17/00* (2006.01)
*H01H 47/26* (2006.01)
*H02B 1/20* (2006.01)
*G06F 12/06* (2006.01)

(52) U.S. Cl. .................. 700/295; 361/211; 361/656; 711/5

(58) Field of Classification Search .............. 361/211, 361/656; 700/295; 711/5
See application file for complete search history.

(56) References Cited

U.S. PATENT DOCUMENTS

| | | | | |
|---|---|---|---|---|
| 3,919,720 A * | 11/1975 | Alliston | | 700/23 |
| 5,227,121 A * | 7/1993 | Scarola et al. | | 376/216 |
| 5,265,131 A * | 11/1993 | Scarola et al. | | 376/259 |
| 5,511,223 A * | 4/1996 | Scecina et al. | | 714/36 |
| 5,652,893 A * | 7/1997 | Ben-Meir et al. | | 713/310 |
| 6,324,607 B1 * | 11/2001 | Korowitz et al. | | 710/300 |
| 6,351,829 B1 * | 2/2002 | Dupont et al. | | 714/48 |
| 6,432,750 B2 * | 8/2002 | Jeon et al. | | 438/122 |
| 6,533,316 B2 * | 3/2003 | Breed et al. | | 280/735 |
| 6,714,969 B1 * | 3/2004 | Klein et al. | | 709/219 |
| 6,777,118 B2 * | 8/2004 | Shioya | | 429/19 |
| 6,804,612 B2 * | 10/2004 | Chow et al. | | 702/34 |
| 7,058,480 B1 | 6/2006 | Kawanishi et al. | | |
| 7,337,256 B2 * | 2/2008 | Korowitz et al. | | 710/301 |
| 7,426,458 B2 * | 9/2008 | Horton et al. | | 703/6 |
| 7,576,635 B2 * | 8/2009 | Bender et al. | | 340/292 |
| 2003/0149904 A1 | 8/2003 | Kim | | |
| 2003/0216893 A1 * | 11/2003 | Hendrickson | | 703/1 |
| 2005/0055587 A1 | 3/2005 | Lee | | |

(Continued)

OTHER PUBLICATIONS

Whiting-R, "RFID growth poses a data management challenge'", 2004, VNU Business Publications, p. 29-30.*

*Primary Examiner*—Albert DeCady
*Assistant Examiner*—Thomas H Stevens

(57) ABSTRACT

There is described a method for operating a system of modular structure, which can be extended during operation by adding modules that consume electrical energy, in particular a process automation system, the system having a power supply, which supplies the other modules of the system with electrical energy, with at least one signal being generated and displayed before a further module that consumes electrical energy is added, from which signal it is possible to identify or derive the level of current electrical power, which the power supply can still supply to the further module to be added given the already added modules—residual power—and/or the level of power, which the power supply supplies currently to the already added modules and/or from which it can be identified or derived whether the module to be added can be added without overloading the power supply.

17 Claims, 1 Drawing Sheet

U.S. PATENT DOCUMENTS

2006/0129856 A1 6/2006 Main et al.
2006/0173655 A1 8/2006 Amano
2009/0062938 A1* 3/2009 Breimesser et al. ........... 700/83

* cited by examiner

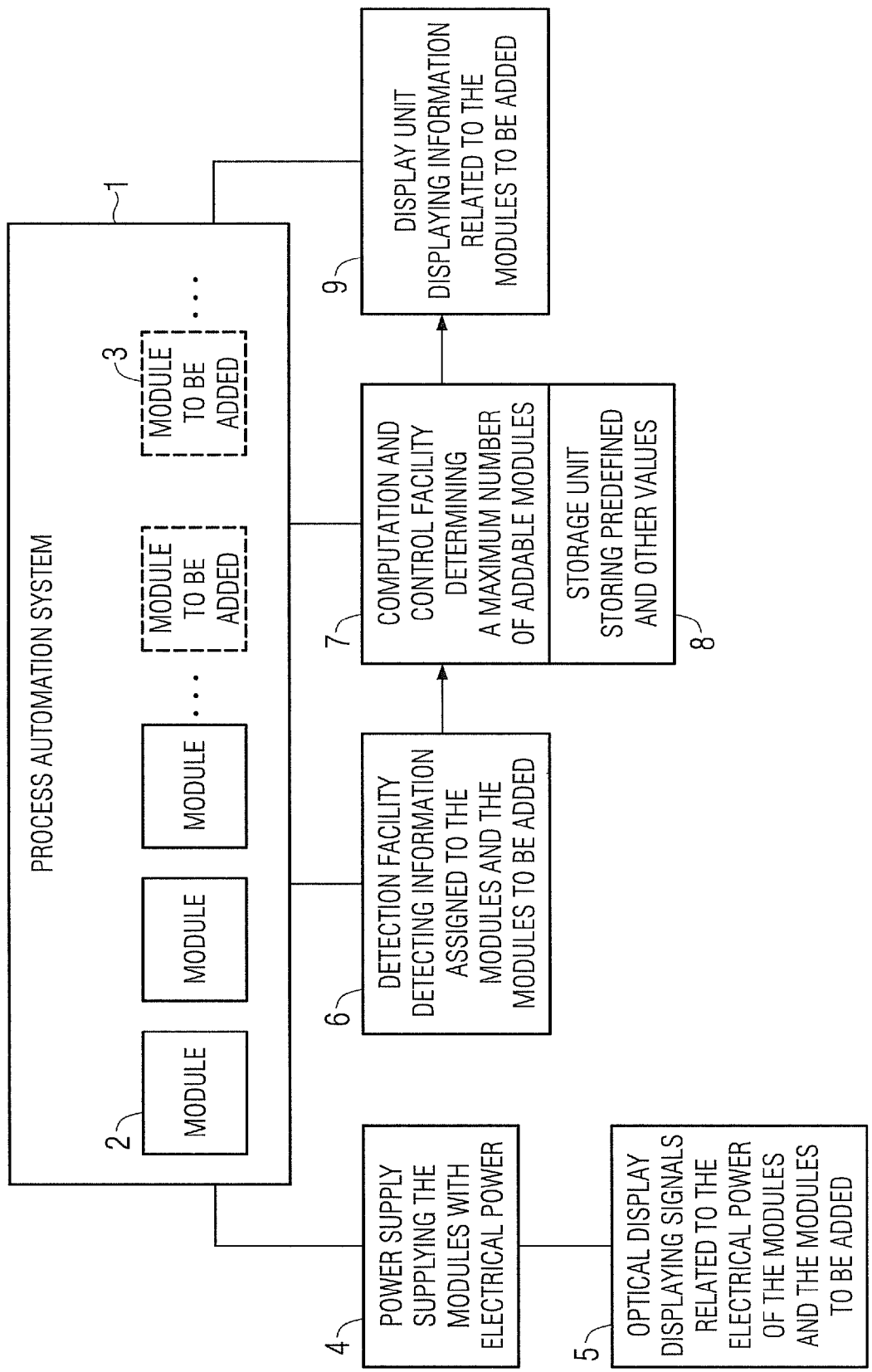

METHOD FOR OPERATING A SYSTEM OF MODULAR STRUCTURE, IN PARTICULAR A PROCESS AUTOMATION SYSTEM

CROSS REFERENCE TO RELATED APPLICATIONS

This application claims priority of European Patent Office application No. 07009961.9 EP filed May 18, 2007, which is incorporated by reference herein in its entirety.

FIELD OF INVENTION

The present invention relates to a method for operating a system of modular structure, which can be extended during operation by adding, in particular by plugging in, modules that consume electrical energy, in particular a process automation system, the system having a power supply, which supplies the other modules of the system with electrical energy.

BACKGROUND OF INVENTION

Process automation systems are frequently of modular structure, in other words the overall system is made up of individual modules, specifically components or component assemblies. Various systems can also be extended during operation, so that modules can be added, in particular can be plugged into slots provided for the purpose, without the overall system having to be switched off or stopped. Switching off the system in this manner would be very problematic specifically in the field of process automation and particularly in the field of plant control, since such downtimes naturally result directly in production stoppages.

There are various problems with regard to extending such systems of modular structure during operation. The so-called overload scenario is particularly problematic. Depending on the power consumption of the module to be added, the power supply output for the system may no longer suffice, given the modules already added, to continue to supply all the modules, including the newly added module. If the module is added anyway, this can overload the power supply and result in its collapse. The entire system fails as a result. This overload scenario is frequently detected directly, as soon as the module to be newly added is added.

However in practice there is also a risk that such overload scenarios may only occur some time after the module is added. The cause is then a temperature-dependent overload response by the power supply. If the external temperature is low, the power supply will for example tolerate a higher output power in the long term than at a higher temperature. In this instance the system can switch to an initially tolerated overload range after a module is added at low external temperature, with this only causing the system to be shut down or to collapse, if the external temperature rises. This can happen hours or even days or weeks after module addition in individual instances.

Various measures are known in the prior art to prevent such overload scenarios when extending the systems mentioned in the introduction.

For example for safety reasons a power supply is used, which is of significantly larger dimensions than the actual requirement. This over-dimensioned power supply is intended to prevent the remaining residual power being inadequate for further modules when they have to be added. One disadvantage of this procedure is that this over-dimensioned power supply results in significant additional costs, which could be avoided. And of course power supply systems of greater power take up more space.

Finally it is known that the individual addable modules can be limited in particular on the system side to a maximum power requirement and the number of addable modules can also be limited on the system side. In this instance the power supply is designed for the maximum overall power requirement under such conditions. In other words the power supply is dimensioned so that it supplies adequate power given the maximum power requirement of the individual modules, even if the maximum possible number of modules is added to the system.

This solution also has the disadvantage that the power supply is over-dimensioned for a plurality of instances, for example if not all the module slots of the system are occupied. A significant excess of power is thus made available, resulting in high costs.

In one alternative to this procedure the power supply is not designed for the maximum overall power required but just for an interim power, which is sufficient for most applications. With this solution system failures are again possible, if more modules are added in an exceptional manner in contrast to the application defined as normal, in other words a greater overall power is required than the power supply can supply.

SUMMARY OF INVENTION

An object of the invention is to specify a method for operating a system of the type mentioned in the introduction, which reduces or avoids the risk of overload scenarios when modules are added and/or over-dimensioning of the power supply to the system.

This object is achieved by a method of the type mentioned in the introduction, having the features of an independent claim.

According to this, before a further module that consumes electrical energy is added, at least one signal is generated and displayed, from which it is possible to identify or derive the level of current electrical power, which the power supply can still supply to the further module to be added given the already added modules—residual power—and/or the level of power, which the power supply currently supplies to the already added modules and/or from which it can be identified or derived whether the module to be added can be added without overloading the power supply.

The underlying inventive concept therefore is that of assisting the user, who is to extend the system of modular structure during operation of the same and in particular to indicate if there is a risk of an overload scenario, in other words a situation, in which there is a risk of the power supply to the system failing due to too great a power requirement on the part of the modules that have been added or are still to be added. Assisting the operator when extending the system significantly reduces the risk of modules being added to the system, which cause the power supply to be overloaded. This means there is largely no need to over-dimension the power supply.

The invention relates preferably to process automation systems but in principle all systems of modular structure that can be extended during operation, which have a power supply supplying one or more modules with electrical energy, can be operated using the inventive method. For example current personal or industrial computers can be operated using the inventive method.

Modules that consume electrical energy in such a system include a very wide range of components or component assemblies, for example CPU modules, peripheral modules, communication modules, etc.

The basis for the application is the electrical power, which is to serve as the characteristic value for judging whether a further module that consumes electrical energy can be added to the system. As the person skilled in the art acknowledges, other variables related indirectly or directly to the electrical power of the power supply and/or modules and/or derivable therefrom can be used, from which it is possible to identify or derive an overload scenario for the power supply.

Therefore one or more signals is/are displayed to the operator responsible for extending the system, from which said operator can identify or derive whether adding the module provided for this purpose may result in the power supply being overloaded.

The term "adding" is used in the context of the application to mean actively connecting a corresponding module that consumes electrical energy to the system in a functional manner so that the module can carry out one or more of the functions assigned to it in the system. In particular the module is hereby actively connected to the system in such a manner that the power supply for the system can supply electrical energy to the module. In process automation systems in particular modules are frequently inserted into slots provided for the modules, preferably into slots of a suitable component or module holder.

According to one inventive alternative a signal is displayed to the operator, from which said operator can identify or derive the level, in other words the value, of the current electrical power, which the power supply can supply to the module to be added. In the simplest instance the residual power of the power supply is displayed to the operator directly, perhaps by means of a suitable numeric display. The displayed residual power allows the operator to, derive whether it is possible to add further modules. The operator only has to know the (in particular maximum) power consumption of the module to be added for this purpose. In principle it is also possible to display the level or value of the power currently supplied by the power supply to the already added modules as well. In this instance the operator must know the overall power of the power supply as well as the (in particular maximum) power consumption of the module to be added, in order to be able to determine the current residual power, which the power supply can still supply to the modules to be added.

In one particular embodiment of the invention on the system side in particular only modules can be added which respectively have identical predefined power consumption values or which at least only have power consumption values which are less than or equal to a predefined power consumption limit value, which is stored in particular in a storage unit. For example the system can be designed such that only modules with an (in particular maximum) power consumption value of 10 watts can be added or which at least have (in particular maximum) power consumption values, which are less than 10 watts or equal to 10 watts.

In this instance a computation and/or control facility assigned to the system can determine a maximum number of addable modules from the predefined power consumption limit value, which forms the upper limit of the individual power consumption values of the modules, and from the current value of the residual power of the power supply given the modules already added, the respective power consumption values of these addable modules being less than or equal to the predefined power consumption limit value. If all the modules have identical power consumption values, the power consumption value may correspond to the power consumption limit value. According to the invention it should be possible to add the determined maximum number of modules without a predefined overload power limit value, which is preferably stored in a storage unit, being reached or exceeded after addition, the reaching or exceeding of which may result in an overload scenario for the power supply. The maximum number can also be taken as a predefined value from a storage unit assigned to the computation and/or control facility instead of being determined by the computation and/or control facility.

Therefore with this embodiment according to the invention an overload power limit value is defined for the power supply. This limit value will generally be a function of the rated power of the power supply. The information is also available to the system or the computation and/or control facility that the (in particular maximum) power consumption value of each module to be added is less than or equal to the predefined power consumption limit value. In a particular instance all the (in particular maximum) power consumption values of the modules are identical.

Finally the residual power, which the power supply can supply to the modules to be added, can be determined or is predefined. The value of the residual power can be determined by way of a suitable residual power detection facility, in particular suitable measuring devices, sensors, etc. The computation and/or control facility can use this information to calculate the maximum number of modules—with in particular respectively identical predefined power consumption values—that can be added to the system, without the overload scenario defined above occurring.

The operator intending to add the modules can use a display, in particular a multi-step display, to display the determined values or the values taken from the storage unit. For example a signal can be displayed, as soon as the maximum number of addable modules is 1. The value 1 means that only one further module with the corresponding power consumption can be added, without the overload power limit value being reached or exceeded. In the case of traffic light display, a previously green light could be switched off and an amber light switched on.

A further signal, distinct from the first signal, can be generated and displayed, when the maximum number of addable modules is 0. The value 0 indicates that no further corresponding module can be added, as otherwise the predefined overload power limit value for the power supply will be reached or exceeded. With the traffic light display mentioned above, the light could change from amber to red.

It is of course also possible to indicate the maximum number of addable modules thus calculated using a numeric display or a (clear) text display, preferably when the maximum number of addable modules is less than or equal to a predefined limit value. For example consideration could be given to displaying the maximum number of addable modules, when perhaps five modules can still be added without the defined overload scenario occurring. In principle it is of course also possible to display the maximum number of addable modules continuously or at certain time intervals independently of the value of the maximum number during overall operation of the system.

In a further embodiment of the present invention it is assumed that different classes of module are deployed. The modules assigned respectively to a module class hereby respectively have (in particular maximum) power consumption values, which are greater than or equal to a predefined class-dependent, lower power limit value and which are lower than or equal to a predefined class-dependent, upper power consumption limit value. Both the upper and lower power consumption limit values are preferably stored in a storage unit. On this assumption, provision is made to determine the maximum number of modules for each power consumption class, which can be added to the system without the overload power limit value for the power supply being reached or exceeded.

The classes or intervals formed by the lower and upper, class-dependent power consumption limit values can be for example: 0 watts-1 watt, 1 watt-2 watts, 3 watts-4 watts, etc.

Correspondingly the computation and/or control facility can determine or take from a storage unit a maximum number of addable modules respectively for the different classes of modules of different, in particular maximum power consumption values, it being possible to add said number without the overload power limit value being reached or exceeded, if the reaching or exceeding of said value might result in an overload scenario for the power supply, it being possible to determine the class-dependent, maximum number of modules from the upper power consumption limit values assigned to each class and respectively forming the upper limit for all addable modules of the corresponding class and from the current value of the residual power of the power supply given the already added modules.

In a further embodiment provision can be made for a signal to be generated and displayed for each of these power consumption classes, when the maximum number of addable modules of this class determined for the respective power consumption class is 1 and a further signal, distinct from the first signal, to be generated, when the maximum number of addable modules of this class is 0.

Accordingly signals are displayed for each power class in the same way as they are displayed for just one class—as set out above. Therefore if the operator wishes for example to add a module of a specific power consumption class to the system, said operator can see from a corresponding display, whether modules of said power consumption class can be added or whether the corresponding overload power limit value for this power consumption class would be reached or exceeded, if a further module were added.

It is for example possible that given the residual power of the power supply a module of a power consumption class with a lower power value, perhaps 0-1 watts can be added without bringing about the overload scenario. This may not apply to a module of a higher power consumption class, for example 4-5 watts, since if this were added, the overload power limit value might possibly be reached or exceeded.

In a further embodiment of the present invention the system uses a detection facility to detect information assigned to the module to be added, in particular wirelessly, preferably automatically. The information assigned to the module to be added here is representative of a predefined power consumption value of the respective module, preferably its maximum power consumption value. It is at least possible to determine the predefined power consumption value of the module from the assigned information.

Accordingly information can be stored on or in the module to be added, in particular on a special information medium, from which information the power consumption value of the module is evident or from which this power consumption value can be determined indirectly or directly.

The detection facility of the system reads this information, preferably automatically. This can be done for example in that the module to be added has a barcode, which is read in a contactless manner by a corresponding barcode reader of the system. The power consumption value of the module is then stored as the barcode or at least contained in this. Alternatively an RFID tag can also be arranged on the module. The detection facility of the system receives the corresponding power consumption information from the RFID tag automatically perhaps, as soon as the module approaches the system. The information assigned to the module is preferably transmitted to the detection facility of the system wirelessly or in a contactless manner. Alternatively transmission can of course also take place in a wired manner.

In a further embodiment the detection facility has an input facility, preferably a keyboard, by way of which the information set out above, which is representative of a predefined power consumption value of the respective module, in particular its maximum power consumption value, or by means of which the predefined power consumption—value can be determined can be transmitted to the system, in particular to the computation and/or control facility of the system. In this instance an operator can input the corresponding power consumption value of the module to be added directly by way of the input facility for example. Alternatively or additionally the operator can select the power consumption class to which the module to be added belongs.

In a further embodiment of the invention the information detected as described above relating to the power consumption value and/or the power consumption class of the specific module to be added can be further processed in the computation and/or control facility assigned to the system.

The power consumption value and/or the power consumption class of the module is/are preferably compared in the computation and/or control facility with the residual power, which the power supply can supply to the module to be added given the already added modules.

The direct result of the comparison or information derived therefrom can be displayed by way of a corresponding display, perhaps an optical or acoustic display. In particular the maximum number of modules of the power consumption value and/or the power consumption class that can still be added can be displayed and/or other information, from which it can be identified or derived, whether the module to be added can be added without there being the risk of bringing about an overload scenario for the power supply as a result.

According to a further embodiment the information assigned to the module to be added relating to the power consumption value of the module is first automatically detected and transmitted to the computation and/or control facility. The computation and/or control facility then uses the power consumption value of the module to be added to select automatically the power consumption class to which the module to be inserted belongs. Finally the maximum number of modules, which can be added of modules of this power consumption class without the predefined overload power limit value being reached or exceeded, the reaching or exceeding of which may result in an overload scenario for the power supply, is displayed automatically by way of a suitable display unit of the system.

As the person skilled in the art acknowledges, many different embodiments of the invention are possible without deviating from the basic concept. The method described in the present application can be implemented easily with corresponding computer and/or control facilities, in particular with suitable sequential programs, and corresponding display facilities.

Further features of the present invention will emerge from the accompanying subclaims.

BRIEF DESCRIPTION OF THE DRAWINGS

FIGURE shows schematically a process automation system and operating the process automation system.

DETAILED DESCRIPTION OF INVENTION

FIGURE shows schematically a process automation system 1 comprising modules 2, wherein the system 1 can be extended during operation with to be added modules 3. The process automation system 1 has a power supply 4 supplying the modules 2, 3 with electrical energy. The modules 2, 3 that consume electrical energy in the system 1 include a very wide range of components or component assemblies, for example CPU modules, peripheral modules, communication modules, etc.

One or more signals are displayed on an optical display 5, from which it can be identified or derived whether adding a module 3 provided for a particular purpose may result in the power supply 4 being overloaded.

A computation and control facility 7 assigned to the system 1 determines a maximum number of addable modules 3 from a predefined power consumption limit value. The maximum number can also be taken as a predefined value from a storage unit 8 assigned to the computation and control facility 7 instead of being determined by the computation and control facility 7.

A display unit 9, in particular a multi-step display, can be used to display determined values or values taken from the storage unit 8. For example, a signal can be displayed as soon as the maximum number of addable modules 3 is 1. The value 1 means that only one further module 3 with corresponding power consumption can be added without the overload power limit value being reached or exceeded.

The system 1 uses a detection facility 6 to detect information assigned to the modules 2, 3, in particular wirelessly, preferably automatically. The information assigned to the modules 2, 3 is representative of a predefined power consumption value of each module 2, 3, preferably its maximum power consumption value. It is at least possible to determine the predefined power consumption value of the module 2, 3 from the assigned information.

The invention claimed is:

1. A method for operating a system of modular structure, which is extendable during operation by adding modules consuming electrical energy, comprising:
   providing a power supply for the system, wherein the power supply supplies the modules of the system consuming electrical energy with electrical energy;
   generating a signal for
      a remaining residual power for a further module to be added, wherein the signal is generated before the further module consuming electrical energy is added to the system, or
      a level of power, which the power supply supplies currently to already added modules, or
      identifying or deriving whether the further module to be added can be added without overloading the power supply; and
   displaying the signal;
   wherein a computation and control facility assigned to the system determines or takes from a storage unit a maximum number of addable modules respectively for different classes of modules of different power consumption values, the maximum number of addable modules being the number of addable modules which can be added without a predefined overload power limit value being reached or exceeded, and
   a class-dependent, maximum number is determined from upper power consumption limit values assigned to each class, which respectively form an upper limit for all addable modules of each corresponding class, and from a current value of a residual power of the power supply provided to the already added modules.

2. The method as claimed in claim 1, wherein the modules are plugged in.

3. The method as claimed in claim 1, wherein the system is a process automation system.

4. The method as claimed in claim 1, wherein the predefined overload power limit value is a function of a rated power of the power supply, and wherein the predefined overload power limit value is greater than the rated power of the power supply.

5. The method as claimed in claim 1, further comprising:
   displaying a first signal when the maximum number of addable modules is one; and
   displaying a second signal, distinct from the first signal when the maximum number of addable modules is zero.

6. The method as claimed in claim 5, wherein the signals are displayed via a multi-step optical display, wherein the multi-step optical display is arranged on the power supply of the system or on a CPU of the system.

7. The method as claimed in claim 1, further comprising:
   displaying the maximum number of addable modules via a numeric display or a text display, wherein the maximum number of addable modules is less than or equal to a predefined limit value.

8. The method as claimed in claim 1, further comprising:
   displaying a third signal, distinct from the first and the second signal, when an overall power consumption of the already added modules is equal to or greater than the overload power limit value.

9. The method as claimed in claim 1, wherein the classes are determined based upon maximum power consumption values.

10. The method as claimed in claim 1, further comprising:
    displaying a first signal for each power consumption class, when the maximum number of addable modules of this class determined for a respective power consumption class is one, and
    displaying a second signal, distinct from the first signal, when the maximum number of addable modules of this class is zero.

11. The method as claimed in claim 10, further comprising:
    displaying a third signal, distinct from the first and second signals, when an overall power consumption of the already added modules of the system is equal to or greater than an overload power limit value.

12. The method as claimed in claim 1, wherein the maximum number of addable modules of one class is displayed with a numeric display or text display, when the maximum number of addable modules of the one class is less than or equal to a predefined limit value.

13. A method for operating a system of modular structure, which is extendable during operation by adding modules consuming electrical energy, comprising:
    providing a power supply for the system, wherein the power supply supplies the modules of the system consuming electrical energy with electrical energy;

generating a signal for
- a remaining residual power for a further module to be added, wherein the signal is generated before the further module consuming electrical energy is added to the system, or
- a level of power, which the power supply supplies currently to already added modules, or
- identifying or deriving whether the further module to be added can be added without overloading the power supply;

displaying the signal;

providing a detection facility; and detecting, by the detection facility, wirelessly information assigned to the further module to be added, wherein said information is representative of a predefined power consumption value of the further module.

14. The method as claimed in claim 13, wherein the detection facility comprises a keyboard for transmitting information to the system, the information being representative of a predefined maximum power consumption value of the further module.

15. The method as claimed in claim 13, further comprising:
- detecting and transmitting information assigned to the module to be added relating to a power consumption value of the module is detected and transmitted to a computation and control facility
- selecting by the computation and control facility, based upon the power consumption value of the module to be added, a power consumption class to which the module to be added belongs;
- providing a display unit to display a maximum number of modules of the power consumption class that can be added without the predefined overload power limit value being reached or exceeded, wherein a reaching or exceeding of which may result in an overload scenario for the power supply is displayed automatically by the display unit.

16. The method as claimed in claim 13, wherein the modules are plugged in.

17. The method as claimed in claim 13, wherein the system is a process automation system.

* * * * *